Patented Jan. 5, 1926.

1,568,753

UNITED STATES PATENT OFFICE.

EDWIN R. LITTMANN, OF TERRE HAUTE, INDIANA, ASSIGNOR TO COMMERCIAL SOLVENTS CORPORATION, OF TERRE HAUTE, INDIANA, A CORPORATION OF MARYLAND.

PAINT AND VARNISH REMOVER AND PROCESS FOR MAKING THE SAME.

No Drawing.      Application filed March 13, 1925. Serial No. 15,362.

*To all whom it may concern:*

Be it known that I, EDWIN R. LITTMANN, a citizen of the United States, residing at Terre Haute, in the county of Vigo and State of Indiana, have invented a certain new and useful Paint and Varnish Remover and Process for Making the Same, of which the following is a specification.

My invention relates to the removal of dried paint, varnish, or lacquer films from surfaces on which such films have been imposed.

Many methods and compositions have been proposed for the removal of such films from various surfaces. In some cases removal has been effected by abrasive and scraping action, and in other cases by solution or loosening of the film by suitable solvents. It is well known that certain organic solvents such as alcohols, ketones, and coal tar products such as benzol, have the property of dissolving or loosening dried paint and varnish films, and may thus be employed as "paint and varnish removers." The volatility of these solvents renders their use—per se—uneconomical, as great quantities of solvents are lost through evaporation from the surface being treated. To reduce the volatility of paint and varnish solvents, various additional ingredients such as waxes and phenolic derivatives have been added to the volatile solvent mixtures.

For example, if a small amount of wax is dissolved in the volatile solvents, the wax is precipitated out during the first stages of solvent evaporation, and the precipitated wax forms a film over the remaining solvents which are thus held close to the surface being treated.

However, certain disadvantages are experienced when admixtures of wax with volatile solvents are used as paint and varnish removers. In the ordinary practice of utilization of a paint and varnish remover, the solution is applied to the surface treated and allowed to remain thereon for a few minutes, during which time the solvents loosen and partially dissolve the paint or varnish film, and the mixture of film and solvents is then scraped off or rubbed off the surface. When such practices are followed with ordinary paint and varnish removers, some of the precipitated wax is rubbed into the otherwise-clean surface. This deposit of wax in the surface causes considerable trouble, particularly if the surface is porous, as it is necessary to re-clean the surface before fresh paint, varnish or lacquer may be applied to it.

One of the objects of my invention is to devise a paint and varnish remover which does not contain any waxes or other materials in a form that will deposit on the cleaned surface. Another object of my invention is to provide a relatively non-volatile paint and varnish remover in which may be incorporated a large proportion of a very excellent paint and varnish solvent—i. e. acetone—which has not been in employed in large proportions in such mixtures in the past on account of its volatility. Other objects of my invention are to provide a less-flammable remover than those now generally employed and to secure a composition of a somewhat "pasty" nature which will not "run," but will stay on the spot where it is first applied.

I have discovered that water solutions of the alkali and alkaline-earth salts of nitrophthalic acid may be employed in conjunction with water-soluble and water-insoluble paint and varnish solvents to form excellent paint and varnish removing compositions. Nitrophthalic acid exists in two chemical forms which are commonly described as 3-nitrophthalic acid and 4-nitrophthalic acid. These compounuds are, respectively, 1, 2, dicarboxy-3 nitro-benzene, and 1, 2, dicarboxy-4 nitro-benzene, the numbers referring to the positions of the chemical groups on the valences of the benzene nucleus. The use of either one of these two forms of nitrophthalic acid in the form of their salts, or mixture thereof, is a part of my invention.

I have discovered that when a small portion of a saturated solution of sodium nitrophthalate is added to a water-soluble or water-miscible paint and varnish solvent, a stiff emulsion or "gel" is produced. The precise physical properties of the "gel" are dependent on the ratio of sodium nitrophthalate solution to the solvent, and, to some extent, on the solvent itself. Suitable water-soluble or water-miscible solvents include various alcohols, such as methyl and ethyl alcohol, various ketones, such as acetone and methyl ethyl ketone, and various ketonic alcohols, such as diacetone alcohol.

For example, one part of a saturated solution of sodium nitrophthalate when mixed with eight to ten parts of acetone or alcohol will cause the admixture to set to form a stiff "gel." The "gel"—per se—will act as a paint and varnish remover and on account of its viscous character it evaporates very slowly and functions very efficiently. However, I prefer to blend water-soluble solvents, such as are above described, with water-insoluble solvents such as the higher alcohols; and with benzol, toluol, naphtha, and other coal-tar solvents; which are known to be efficient paint and varnish removers.

I have discovered that water-miscible solvents, such as acetone, may be blended with other solvents, such as benzol and that the whole mixture may be emulsified or "gelled" by adding a small proportion of a saturated solution of sodium nitrophthalate and shaking the mixture. The fluidity of the "gel" may be varied by varying the amounts of ingredients used and the resultant mixture may be made as stiff as butter or as thin as cream in accordance with the proportions employed.

In my process for removing paint and varnish I prefer to prepare a "gel" of the consistency of thick cream. This may be applied with a brush to the surface to be treated, and on account of its viscous nature it does not flow out much, but stays where it is applied. Owing to the low volatility induced by the "gel formation" and to the presence of water, the mixture is not easily flammable. The solvents retained in the "gel" attack the paint, varnish or lacquer film on the surface treated and "loosen" or partly dissolve it. The loosened film together with the varnish remover is then removed from the surface by wiping it with a cloth.

While my invention is capable of many modifications in composition ingredients and in proportions of ingredients, I shall give but three examples of approved formulae:—

I. 30 parts benzol, 35 parts acetone, 35 parts ethyl alcohol, 10 parts of a saturated solution of sodium nitrophthalate.

II. 10 parts benzol, 45 parts acetone, 45 parts ethyl alcohol, 10 parts of a saturated solution of sodium nitrophthalate.

III. 30 parts benzol, 35 parts ethyl alcohol, 35 parts diacetone alcohol, 10 parts of a saturated solution of sodium nitrophthalate.

Now, having fully described my invention, I claim the following as new and novel:—

1. A paint and varnish remover comprising a saturated aqueous solution of an alkaline salt of nitrophthalic acid, and a water-soluble organic paint and varnish solvent.

2. A paint and varnish remover comprising a saturated aqueous solution of an alkaline salt of nitrophthalic acid, a water-soluble organic paint and varnish solvent, and a water-insoluble paint and varnish solvent.

3. A paint and varnish remover comprising a saturated aqueous solution of sodium nitrophthalate, and a water-soluble organic paint and varnish solvent.

4. A paint and varnish remover comprising a saturated aqueous solution of sodium nitrophthalate, a water-soluble organic paint and varnish solvent, and a water insoluble paint and varnish solvent.

5. A paint and varnish remover comprising a saturated aqueous solution of sodium nitrophthalate, acetone, ethyl alcohol, benzol, and toluol.

6. A paint and varnish remover comprising a saturated aqueous solution of sodium nitrophthalate, acetone, and benzol.

7. A paint and varnish remover comprising a saturated aqueous solution of sodium nitrophthalate, and acetone.

8. In the manufacture of paint and varnish removers, the step which consists in adding a saturated aqueous solution of sodium nitrophthalate to a water-soluble organic solvent to produce a "gel."

9. In the manufacture of paint and varnish removers, the step which consists in adding a saturated aqueous solution of sodium nitrophthalate to a mixture of water-soluble and water-insoluble organic solvents to produce a gel.

EDWIN R. LITTMANN.